United States Patent
Triplett et al.

(10) Patent No.: US 8,125,684 B2
(45) Date of Patent: Feb. 28, 2012

(54) METHOD AND SYSTEM FOR PRINTING USING SELECTING PRINTING CONFIGURATION BASED ON ATTRIBUTE RATING

(75) Inventors: Roger Lee Triplett, Penfield, NY (US); Norman David Robinson, Jr., Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 876 days.

(21) Appl. No.: 12/186,300

(22) Filed: Aug. 5, 2008

(65) Prior Publication Data

US 2010/0033736 A1 Feb. 11, 2010

(51) Int. Cl.
*H04N 1/40* (2006.01)
*H04N 1/60* (2006.01)
*G06K 15/02* (2006.01)

(52) U.S. Cl. ......... 358/1.9; 358/1.13; 358/518; 358/523

(58) Field of Classification Search .................... 358/1.9, 358/1.13, 1.15, 501, 518, 401, 407, 468, 358/296, 523; 399/24, 27, 28, 30, 82, 83, 399/85, 86
See application file for complete search history.

(56) References Cited

U.S. PATENT DOCUMENTS

| | | | | |
|---|---|---|---|---|
| 5,129,639 A * | 7/1992 | DeHority | | 270/1.01 |
| 5,467,434 A * | 11/1995 | Hower et al. | | 358/1.15 |
| 5,813,348 A * | 9/1998 | Zingher | | 358/1.15 |
| 6,373,585 B1 * | 4/2002 | Mastie et al. | | 358/1.15 |
| 6,515,756 B1 * | 2/2003 | Mastie et al. | | 358/1.15 |
| 6,529,286 B1 * | 3/2003 | King | | 358/1.14 |
| 6,621,589 B1 * | 9/2003 | Al-Kazily et al. | | 358/1.15 |
| 6,943,905 B2 * | 9/2005 | Ferlitsch | | 358/1.13 |
| 7,133,166 B2 * | 11/2006 | Ferlitsch et al. | | 358/474 |
| 7,298,501 B2 * | 11/2007 | Christodoulou et al. | | 358/1.15 |
| 7,304,760 B2 * | 12/2007 | Ferlitsch | | 358/1.15 |
| 7,426,046 B2 * | 9/2008 | Shirai et al. | | 358/1.13 |
| 7,468,804 B2 * | 12/2008 | Wei | | 358/1.15 |
| 7,847,956 B2 * | 12/2010 | Farrell et al. | | 358/1.13 |
| 7,936,468 B2 * | 5/2011 | Ferlitsch | | 358/1.15 |
| 2007/0002342 A1 | 1/2007 | Morales et al. | | |
| 2008/0043263 A1 | 2/2008 | Hancock et al. | | |
| 2008/0174810 A1 * | 7/2008 | Kim et al. | | 358/1.15 |
| 2009/0273808 A1 * | 11/2009 | Kohli et al. | | 358/1.15 |

* cited by examiner

*Primary Examiner* — Scott A Rogers

(74) *Attorney, Agent, or Firm* — Oliff & Berridge, PLC

(57) ABSTRACT

Aspects of the disclosure provide a printing method that can determine a configuration of a printing system based on contents of a printing job to achieve an optimum image quality for the printing job. Further, the configuration can be provided to a configuration update mechanism via a communication method. The printing method can include storing a plurality of printing configurations for at least one printer, analyzing a printing job to determine printing characteristics, rating the plurality of printing configurations based on printing abilities of the plurality of printing configurations corresponding to the printing characteristics, and selecting a printing configuration based on the rating.

6 Claims, 4 Drawing Sheets

METHOD AND SYSTEM FOR PRINTING USING SELECTING PRINTING CONFIGURATION BASED ON ATTRIBUTE RATING

BACKGROUND

A printing system can be configurable. For example, a printing system may include at least five development stations. Four development stations can be configured to provide generally used cyan, magenta, yellow, and black (CMYK) toners. The fifth development station can be configured to provide a toner of an additional color, such as orange (O), violet (V), green (G), and the like. Alternatively, the fifth development station can be configured to provide a lightly pigmented toner, such as lightly pigmented cyan toner, lightly pigmented magenta toner, and the like.

SUMMARY

A printing system in different configurations may perform a printing job with different image qualities. Aspects of the disclosure can provide a printing method that can determine a configuration of a printing system based on contents of a printing job to achieve an optimum image quality for the printing job.

The printing method can include storing a plurality of printing configurations for at least one printer, analyzing a printing job to determine printing characteristics, rating the plurality of printing configurations based on printing abilities of the plurality of printing configurations corresponding to the printing characteristics, and selecting a printing configuration based on the rating.

Further, the method can include coupling the printing configuration with the printing job. Specifically, the method can include attaching a data representation indicating the printing configuration with the printing job. Subsequently, the method can include executing the printing job according to the printing configuration.

According to an aspect of the disclosure, the plurality of printing configurations can include toner configurations of the at least one printer. Further, at least one toner configuration can include cyan, magenta, yellow, black (CMYK), and at least one additional color. Additionally, at least one toner configuration can include a lightly pigmented toner.

To rate the plurality of printing configurations, the method can further include rating the plurality of printing configurations according to at least one of a color gamut rating, a smoothness rating and a spot color rating of the plurality of printing configurations corresponding to the printing characteristics. Additionally, the method can include rating the plurality of printing configurations according to a combination of a color gamut rating, a smoothness rating and a spot color rating of the plurality of printing configurations corresponding to the printing characteristics.

To calculate the color gamut rating, the method can include summing up an unsatisfied color gamut of the printing job according to printing abilities of a configuration. Further, the method may calculate the color gamut rating as a function of:

$$Demerit_{gamut} = 100 \times \left( \sum_{n=1}^{T} W(L, a, b) \times P_n \right) / T,$$

where $W(L,a,b)$ denotes a look-up table entry which can be a weight as a function of a color L, and pixel coordinates a and b, $P_n$ denotes a binary number indicating whether the color at the pixel is inside or outside of the color gamut of the configuration (1 for outside and 0 for inside), and T denotes a total number of pixels for evaluation.

To calculate the smoothness rating, the method can include summing up an area of unsatisfied smoothness of the printing job according to printing abilities of a configuration. Further, the method can calculate the smoothness rating as a function of:

$$Demerit_{uniform} = (K_I \times P_S \times P_{AI} + K_V \times P_V) \times C_i,$$

where $K_I$ denotes a weight factor for an image object portion, $P_S$ denotes a percentage of smoothness sensitive area of the image object portion, $P_{AI}$ denotes a percentage of image object area, $K_V$ denotes a weigh factor for a vector object portion, $P_V$ denotes a percentage of large uniform area, and $C_i$ denotes a scaling constant for the configuration.

To calculate the spot color rating, the method can include summing up unsatisfied spot colors of the printing job according to printing abilities of a configuration. Further, the method can calculate the spot color rating as a function of:

$$Demerit_{spot} = K \times \sum_{i=1}^{N_{spots}} P_{AS}(i) \times P_n(i),$$

where $P_{AS}$ denotes a percentage of printing area of pantone spot colors, $P_n$ denotes a classification of the pantone spot colors (1 for outside the color gamut and 0 for inside the color gamut), $N_{spot}$ denotes a number of unique spot colors, and K denotes a weight factor for the spot color rating.

According to an aspect of the disclosure, the printing characteristics can include color characteristics and object characteristics. Further, the printing characteristics of the printing job can be analyzed during a raster image processing of the printing job and/or during a preflight operation of the printing job.

According to an aspect of the disclosure, the method can further include routing the printing job to a printer of the at least one printer according to the selected printing configuration. Additionally, the method can rate the plurality of printing configurations according to at least one of a demerit scale, a merit scale and a cost function scale.

Aspects of the disclosure can also provide a printing system. The printing system can include a configurable printing component comprising at least one printer, a controller coupled to the configurable printing component, the controller being configured to store a plurality of printing configurations for the configurable printing component, analyze a printing job to determine printing characteristics, rate the plurality of printing configurations based on printing abilities of the plurality of printing configurations corresponding to the printing characteristics, and select a printing configuration based on the rating.

According to an aspect of the disclosure, the controller can be coupled to the configurable printing component via a network connection.

In an embodiment, the configurable printing component can include a printer having at least five development stations. Further, the at least five development stations can respectively include a toner of cyan, magenta, yellow, black and at least one additional color. In addition, at least one development station of the at least five development stations can include a lightly pigmented toner.

BRIEF DESCRIPTION OF THE DRAWINGS

Various exemplary embodiments of this disclosure will be described in detail with reference to the following figures, wherein like numerals reference like elements, and wherein.

EMBODIMENTS

Figure 1:
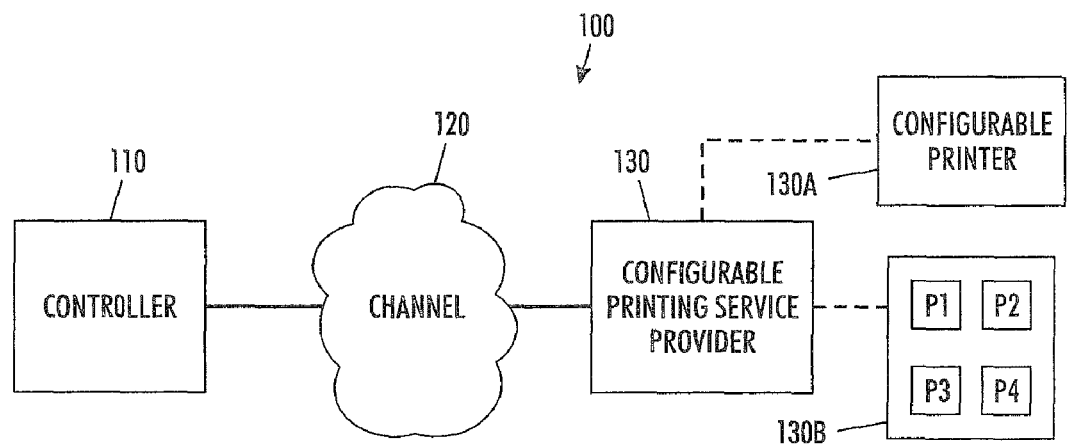
FIG. 1 shows an exemplary content aware configurable printing system.

FIG. 1 shows a block diagram of an exemplary content aware configurable printing system. The content aware configurable printing system 100 may include a controller 110, a configurable printing service provider 130, and a communication channel 120 that couples the controller 110 and the configurable printing service provider 130. The content aware configurable printing system 100 can determine a configuration, for example an optimum configuration, based on contents of a printing job, and communicate the configuration to a configuration update mechanism in order to execute the printing job accordingly.

The controller 110 may store a plurality of printing configurations of the configurable printing service provider 130. For example, the controller 110 may send a query for available configurations via the channel 120. Accordingly, the configurable printing service provider 130 may determine a plurality of available printing configurations based on various factors, such as a stocking status of various toners, configurations of a group of printers, a configuration queuing mechanism, and the like. The configurable printing service provider 130 may provide the plurality of available printing configurations to the controller 110 via the communication channel 120. The controller 110 may save the plurality of available printing configurations in a memory medium that can be accessible.

Further, the controller 110 may receive a printing job, for example, from a running process, a network device, and other printing job originating mechanisms. Then, the controller 110 can determine a configuration from the plurality of available printing configurations based on contents of the printing job. For example, the configuration may enable the configurable printing service provider 130 to perform the printing job with an optimum image quality. Subsequently, the controller 110 may send the printing job to the configurable printing service provider 130 via the channel 120. In addition, the controller 110 may communicate the configuration to the configurable printing service provider 130, for example via a ticketing mechanism.

In an embodiment, the controller 110 may include a preflight tool, such as a preflight printing component of a software program. The software program may process a document that can be printable. The preflight printing component may determine a printing configuration from the plurality of available printing configuration based on the document when the software program processes the document. Further, the preflight printing component may attach a data representation indicating the printing configuration with the document. Later, the document with the printing configuration can be submitted for printing.

The channel 120 can broadly include communication channels, such as digital wired or wireless communications over a network, as well as any other system or device through which data can be passed between the controller 110 and the configurable printing service provider 130.

The configurable printing service provider 130 may provide a printing service according to one of a plurality of printing configurations. In an embodiment, the configurable printing service provider 130 may include a configurable printer as shown by 130A. For example, the configurable printer 130A may include at least five development stations. Among the five development stations, four development stations can be generally used cyan, magenta, yellow, and black (CMYK) development stations, and the fifth development station can be configured to provide an additional toner. Therefore, the configurable printer 130A can be configured based on the additional toner of the fifth development station. For example, the fifth development station can provide a toner of an additional color, such as orange (O), violet (V), green (G), and the like. The additional color can work with the CMYK colors to provide an extended gamut. Therefore, the configurable printer 130A can be arranged in an extended gamut configuration.

In another example, the fifth development station can provide a lightly pigmented toner, such as lightly pigmented cyan toner, lightly pigmented magenta toner, and the like. The lightly pigmented toner can work with regular pigmented toner to improve image smoothness. Therefore, the configurable printer 130A can be arranged in an extended smoothness configuration.

Further, the fifth development station can provide a spot color toner, such as corporate logo color, metallic color toner, and the like, such that the configurable printer 130A can be configured into a custom spot color configuration, for example.

The configurable printing service provider 130 may include a configuration update mechanism that can update a current configuration accordingly. For example, the current configuration may be determined and updated manually by an operator, based on job priorities, queue time, and the like. In another example, the current configuration may be determined by an automatic mechanism. The automatic mechanism may be implemented as a processor running an algorithm, to determine the current configuration. Further, the processor may transmit control signals to drivers to update the configurable printing service provider 130 to the current configuration.

Alternatively, the configurable printing service provider 130 may include a group of printers that can be configured differently. For example, the configurable printing service provider 130 may include four printers P1-P4 as shown by 130B. Printer P1 can include at least five development stations. Four of the development stations can provide CMYK toners, and the fifth development station can provide an orange toner, for example. Printer P2 can also include at least five development stations. Similar to printer P1, four of the development stations can include CMYK toners. However, the fifth development station can be configured to provide a lightly pigmented cyan toner, for example.

For the ease of description, the disclosure is presented with regard to toner configurations, such as at least five development stations. However, the disclosure can be utilized on other printing configurations. For example, the configurable printing service provider 130B may include printers of different marking technologies: printer P1 can use a xerographic printing technology; and printer P2 can use a photographic printing technology. In addition, the printer P1 may have less than five development stations, for example.

The configurable printing service provider 130 may maintain a plurality of available configurations, for example in a configuration table stored in a storage medium. The configuration table can be updated, for example by an operator based on available toners. In another embodiment, the configuration table can be updated based on an automatic detection mechanism, such as a RF toner label detection mechanism.

During operation, the controller 110 may determine a configuration, for example an optimum configuration, for a printing job. The controller 110 may send the printing job to the configurable printing service provider 130 via the communication channel 120. In addition, the controller 110 may communicate with the configurable printing service provider 130 regarding the configuration. In an example, the controller 110 may attach a data representation to the printing job. The data representation may indicate the configuration. Therefore, the printing job can be printed accordingly. In an embodiment, such as the configurable printer 130A, the printing job may inform the configurable printer 130A to be configured appropriately. In another embodiment, such as the group of printers 130B, the printing job can be routed to an appropriate printer of the group according to the data representation. On the other hand, the configurable printing service provider 130 may update its available configurations and provide configuration information to the controller 110, for example, via the channel 120.

Figure 2:
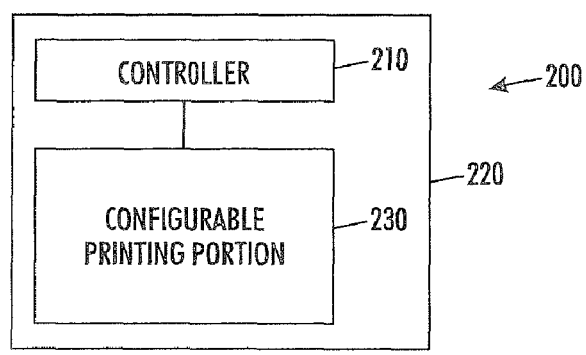
FIG. 2 shows another exemplary content aware configurable printing system.

FIG. 2 shows another exemplary content aware configurable printing system. The content aware configurable printing system 200 can be implemented in a printer 220. The printer 220 may include a controller 210 and a configurable printing portion 230 coupled together as shown in FIG. 2.

The configurable printing portion 230 may include configurable components. For example, the configurable printing portion 230 may include at least five development stations. Four of the development stations can be CMYK development stations. The fifth development station can be configured to provide an additional toner. Therefore, the configurable printing portion 230 can be configured into various configurations, such as an extended gamut configuration, an extended smoothness configuration, a customer spot color configuration, and the like, based on the additional toner of the fifth development station.

The controller 210 may store a plurality of printing configurations of the configurable printing portion 230, for example, in a look-up table. Further, the controller 210 may receive a printing job, for example, from a running process, a network device, and other printing job originating mechanisms. Further, the controller 210 can determine a configuration, for example an optimum configuration, from the plurality of available printing configurations in accordance to contents of the printing job. Subsequently, the controller 210 may communicate the optimum configuration to a configuration update mechanism. For example, the controller 210 may initiate a pop-up window in a display to suggest the configuration to an operator.

Figure 3:
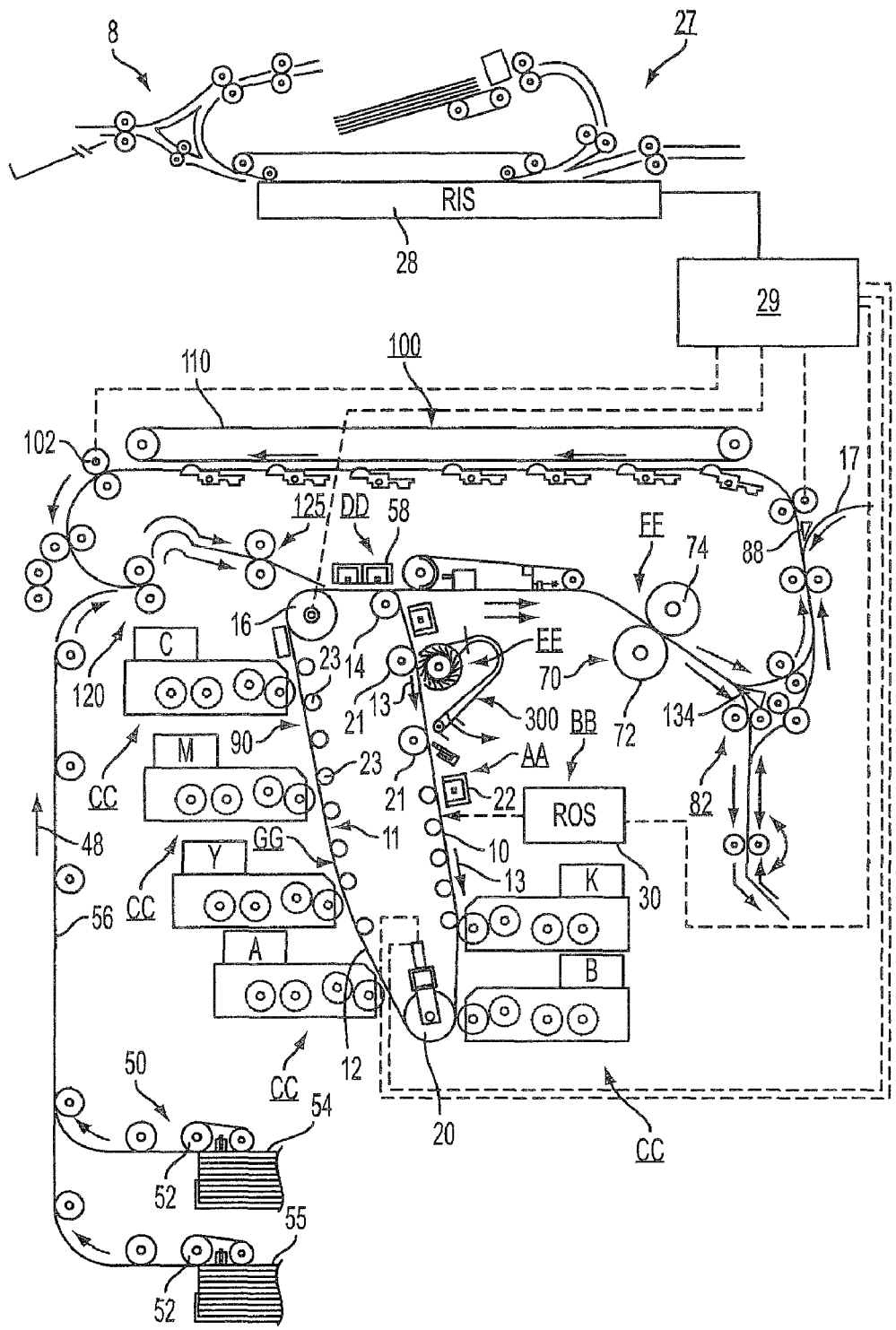
FIG. 3 shows an exemplary configurable printing device.

FIG. 3 shows a schematic elevational view of an exemplary printer according to the disclosure. The printer 300 can include various components, such as a photoreceptor device GG, a cleaning system EE, a charging system AA, an exposing system BB, a developing system CC, a transferring system DD, a fusing system FF, and the like, that support creating desired images. These elements can be coupled as shown in FIG. 3.

The photoreceptor device GG can be implemented in the form of a photoreceptor belt with a coated layer of a photoconductive material. The photoreceptor device GG can move in a direction of arrow 13 to advance successively to other components of the printer 300. It should be noted that the photoreceptor device GG can be implemented in other forms, such as a photoreceptor drum.

The cleaning system EE can remove particles, such as residue toner particles, from the surface of the photoreceptor device GG. The charging system AA can prepare the surface of the photoreceptor device GG with electrical charges for subsequent printing process. More specifically, the charging system AA can produce electric fields, such as corona, to charge the surface of the photoreceptor device GG to a substantial uniform potential.

The exposing system BB can include a light emitting device, such as a semiconductor laser device, to emit a light beam having an intensity corresponding to a color density of a desired image. The light beam can pass through an optical system, and scan the surface of the photoreceptor device GG. Therefore, the electric potential of the photoreceptor device GG can be modified by the light beam to create an electrostatic latent image.

The developing system CC may include a plurality of development stations. For example, the developing system may include six development stations K, Y, M, C, A and B in FIG. 3. A development station can bring a developing material, such as toner particles, in contact with the electrostatic latent image on the surface of the photoreceptor device GG. For example, the development station K may provide black toner particles, the development station Y may provide yellow toner particles, the development station M may provide magenta toner particles, and the development station C may provide cyan toner particles. The toner particles can be attracted to the surface of the photoreceptor device GG according to the electrostatic latent image to create a toner image.

Generally, the development stations CMYK can work together to have a color gamut that covers a portion of a full pantone color gamut. In an embodiment, a development station of the development stations A and B can be configured to provide a toner of an additional color. Therefore, the toner of the additional color can work together with the CMYK toners to extend the color gamut of the printer 300.

In another embodiment, a development station of the development stations A and B can be configured to provide a toner of a customized spot color. A customized spot color may be required by a printing job. For example, a printing job may include an embedded call to specify a pantone spot color. The pantone spot color can be outside of the color gamut that is covered by the CMYK toners. A development station of the development stations A and B can be configured to provide a toner of the pantone spot color to enable the printer 300 to perform the printing job with abilities to print the customized spot color.

In another embodiment, a development station of the development stations A and B can be configured to provide a lightly pigmented toner. The lightly pigmented toner can enable the printer 300 to improve image quality, such as smoothness, noise resistance, and the like. Generally, when a color density is less than 100%, the color density can be printed by a halftone technique. For example, the halftone technique can simulate a percentage of color density by printing the percentage area of a unit area with 100% color density. However, the halftone technique may result in low image quality, for example non-smoothness and sensitive to noises, in some cases, such as close-up faces, cloud-free sky, large area with non-saturated fills, and the like. In an example, image quality, such as smoothness and resistance to noise, can be improved by utilizing lightly pigmented toners.

The transferring system DD can then transfer a toner image from the surface of the photoreceptor device GG to a supporting sheet, such as a piece of paper. Further, the fusing system FF can permanently fuse the toner image on the supporting sheet.

During operation, for example, the surface of the photoreceptor device GG can turn to the cleaning system EE. The cleaning system EE can remove residue toner particles from a previous printing. Then, the surface of the photoreceptor device GG can move to the charging system AA. The charging system AA can charge the surface of the photoreceptor device GG to a substantially uniform potential. Subsequently, the surface of the photoreceptor device GG can move to the exposing system BB. The exposing system BB can dissipate the charges on the surface of the photoreceptor device GG according to a desired image to produce an electrostatic latent image.

Further, a development station of the developing system CC can apply toner particles to the surface of the photoreceptor device GG. The toner particles can adhere to the surface of the photoreceptor device GG according to the electrostatic latent image, and thereby create a toner image. The toner image can then be transferred to a supporting sheet. In addition to the CMYK toner images, the printer 300 can be configured to provide additional toner images from development stations A and B based on contents of a printing job to improve image quality.

Figure 4:
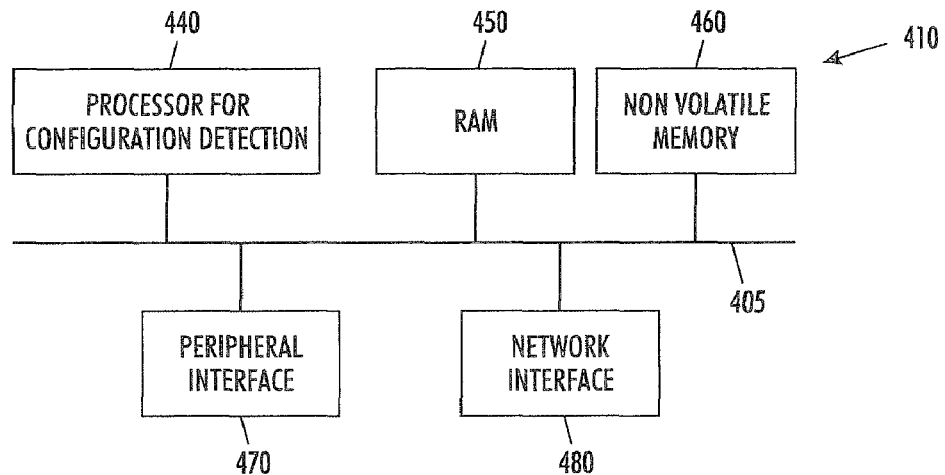
FIG. 4 shows a block diagram of an exemplary controller.

FIG. 4 shows block diagrams of an exemplary controller. The controller 410 can include various components, such as a processor 440, a non-volatile memory unit 460, a RAM unit 450, a peripheral interface 470, a network interface 480, and the like. These components can be coupled together as shown in FIG. 4.

The processor 440 can execute system and application codes. More specifically, the processor 440 may execute codes for determining a configuration from a plurality of printing configurations based on contents of a printing job. For example, the processor 440 may analyze the printing job to determine printing characteristics, such as color characteristics, object characteristics, and the like. Further, the processor 440 may rate the plurality of printing configurations based on printing abilities of the plurality of printing configurations corresponding to the printing characteristics, and select a printing configuration based on the rating.

The non-volatile memory unit 460 can store system and application codes that generally do not change, such as firmware. The RAM unit 450 is writeable and readable, and can be accessed at a fast speed. The peripheral interface 470 can connect the controller 410 with peripheral devices, for example, a display screen. The network interface 480 can enable the controller 410 to communicate with other devices on a network. For example, in a printing system as shown in FIG. 1, the network interface 480 can enable the controller to communicate with a configurable printing service provider via a network.

In addition, as shown in FIG. 4, a bus 405 can be used to couple the components of the controller 410. In an embodiment of a printing system as shown in FIG. 2, the bus 405 may enable the controller 410 to communicate with a configurable printing portion.

During operation, the controller 410 may receive a printing job, for example from the network interface 480. The printing job can be saved in a memory medium, such as the RAM unit 450. Also, the controller 410 may maintain a plurality of available printing configurations. The plurality of available printing configurations can be evaluated according to the printing job.

In an embodiment, the processor 440 may execute codes of a software including a preflight printing component. The preflight printing component can evaluate the plurality of available printing configurations based on contents of the printing job. In another embodiment, the processor 440 may execute codes for generating raster image pages from the printing job. Meanwhile, the processor 440 may rate the plurality of available printing configurations based on contents of the printing job.

The printing configurations can be rated based on printing abilities, such as color gamut, smoothness, and the like, corresponding to printing characteristics of the printing job. The controller 410 may use a scale, such as a cost function scale, a merit scale, a demerit scale, and the like, for rating a printing configuration according to the printing characteristics of the printing job. In an embodiment, a demerit value can be computed according to a configuration and printing characteristics of the printing job. The demerit value can be utilized to indicate an unsatisfactory level of the configuration to perform the printing job. The demerit value can include various components, such as gamut demerit, smoothness demerit, spot color demerit, and the like.

The gamut demerit can indicate a measure of unsatisfied color gamut of the printing job according to a configuration. In an example, color contents of the printing job can be transformed into a device independent color space, such as CIELab. Then, colors of the page can be evaluated with respect to the plurality of available printing configurations, such as CMYK, CMYKO, CMYKOV, CMYKOG, and the like. Each printing configuration may provide a color gamut. The color gamut and the colors of the page can be compared to determine the gamut demerit. In addition, number of pixels of the unsatisfied colors can be taken into account.

In an embodiment, the gamut demerit can be computed based on equations, such as Eq. 1.

$$Demerit_{gamut} = 100 \times \left( \sum_{n=1}^{T} W(L, a, b) \times P_n \right) / T \qquad \text{Eq. 1}$$

where W (L,a,b) denotes a look-up table entry which can be a weight as a function of a color L, and pixel coordinates a and b; Pn denotes a binary number indicating that whether the color at the pixel is inside or outside of the color gamut (for example 1 for outside, and 0 for inside); and T denotes a total number of pixels for evaluation.

The smoothness demerit can indicate a measure of unsatisfied smoothness of the printing job according to a configuration. In an example, the smoothness demerit may include an image object portion and a vector object portion. The image object portion can be related to sizes and characteristics of image objects of the printing job. The vector object portion can be related to sizes and characteristics of the vector objects of the printing job.

In an embodiment, the image object portion can be extracted and analyzed for sizes and characteristics. For example, the image objects can be evaluated based on a percentage of image area, and a percentage of smoothness sensitive content.

Generally, large size image objects, for example larger than a threshold, can be sensitive to smoothness. In an embodiment, the image objects that are larger than a threshold, such as at least one dimension is over 2 inches, can be summed up. The percentage of image area can be calculated as the summed up image area over a total print area.

Specific image objects, such as closed-up faces, the cloud-free sky, and the like, can be sensitive to smoothness. The specific image objects can be detected, for example, by a content classification technology. The specific image objects of each image can be detected and statistically summed into the percentage of smoothness sensitive content.

Additionally, the vector objects can be analyzed to compute the vector object portion of the smoothness demerit. For example, the vector object portion can be evaluated based on a percentage of large uniform regions. To calculate the percentage of large uniform regions, the vector objects that are larger than a threshold, such as 2 inches, can be identified. Further, the identified vector objects that can be smoothness sensitive can be summed up. In an example, vector objects with non-saturated fills, such as non-solid black, cyan, magenta, or yellow, can be smoothness sensitive. Additionally, the summed regions can be used to calculate the percentage of large uniform region by dividing the total print area.

Further, the image object portion and the vector object portion can be combined to compute the smoothness demerit according to a configuration. In an embodiment, the smoothness demerit can be computed based on equations, such as Eq. 2.

$$\text{Demerit}_{uniform} = (K_I \times P_S \times P_{AI} + K_V \times P_V) \times C_i \qquad \text{Eq. 2}$$

where $K_I$ denotes a weight factor for the image object portion; $P_S$ denotes the percentage of smoothness sensitive content, such as the closed-up faces and cloud-free sky, of the image object portion; $P_{AI}$ denotes the percentage of image area; $K_V$ denotes a weigh factor for the vector object portion; $P_V$ denotes the percentage of large uniform region; and $C_i$ denotes a scaling constant for each of the printing configurations. Generally, a configuration with lightly pigmented toners can have a smaller scaling constant than a configuration without lightly pigmented toners.

The spot color demerit can indicate a measure of unsatisfied spot colors of the printing job according to a configuration. In an embodiment, the printing job can be examined for embedded calls including specific pantone spot colors. Further, a percentage of printing area of each specific pantone spot color can be analyzed. In addition, each specific pantone spot color can be classified based on whether it is inside or outside the color gamut of a printing configuration. In an example, the spot color demerit can be computed based on equations, such as Eq. 3.

$$\text{Demerit}_{spot} = K \times \sum_{i=1}^{N_{spots}} P_{AS}(i) \times P_n(i) \qquad \text{Eq. 3}$$

where $P_{AS}$ denotes the percentage of printing area of the pantone spot colors; $P_n$ denotes the classification of the pantone spot colors, for example 1 for outside the color gamut and 0 for inside the color gamut; $N_{spot}$ denotes a number of unique spot colors; and K denotes a weight factor for the spot color demerit.

Subsequently, various demerit values can be used to determine a configuration. In an embodiment, the various demerit values for a configuration can be combined, for example according to an assigned weight. The combined demerit value can be used to determine a configuration, such as a configuration with a lowest combined demerit value, for the printing job. It should be noted that if a merit scale is used, a configuration with a highest combined merit value may be determined for the printing job.

In another embodiment, the various demerit values for the plurality of printing configurations can be statistically provided to an operator to determine a configuration for the printing job.

In an example, the determined configuration can be attached with the printing job via a ticketing mechanism. Further, the configuration can be provided to a configuration update mechanism. In an example, the configuration can be prompted to an operator to recommend the configuration. The operator may make decisions of a configuration for printing. In another example, the configuration can be scheduled according to a scheduling mechanism, such that the printing job can be printed accordingly.

Figure 5:
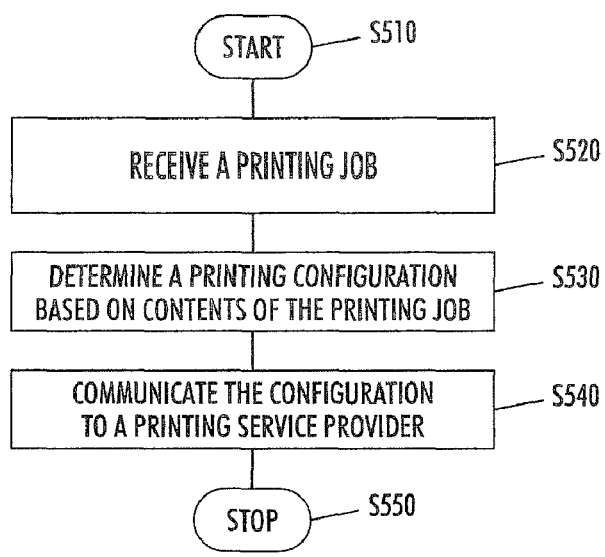
FIG. 5 shows a flowchart outlining an exemplary configuration determination process.

FIG. 5 shows a flowchart outlining an exemplary configuration determination process. The process starts at step S510 and proceeds to step S520. In step S520, a printing controller, such as a remote controller in FIG. 1, a local controller in FIG. 2, and the like, may receive a printing job. Additionally, the printing controller may maintain available printing configurations of a printing service provider, for example in a look-up table. The process then proceeds to step S530.

In step S530, the printing controller may determine a configuration based on contents of the printing job. In an embodiment, the printing controller may calculate a demerit value for each of the available printing configurations according to contents of the printing job. The demerit value may include a portion of color gamut demerit, a portion of smoothness demerit, and a portion of spot color demerit. The process then proceeds to step S540.

In step S540, the printing controller may send the printing job to the printing service provider and communicate the configuration to the printing service provider. In an embodiment, the printing controller may attach a data representation indicating the configuration with the printing job. In another embodiment, the printing controller may pop up a display to suggest the configuration to an operator of the system. The process then proceeds to step S550 and terminates.

Figure 6:
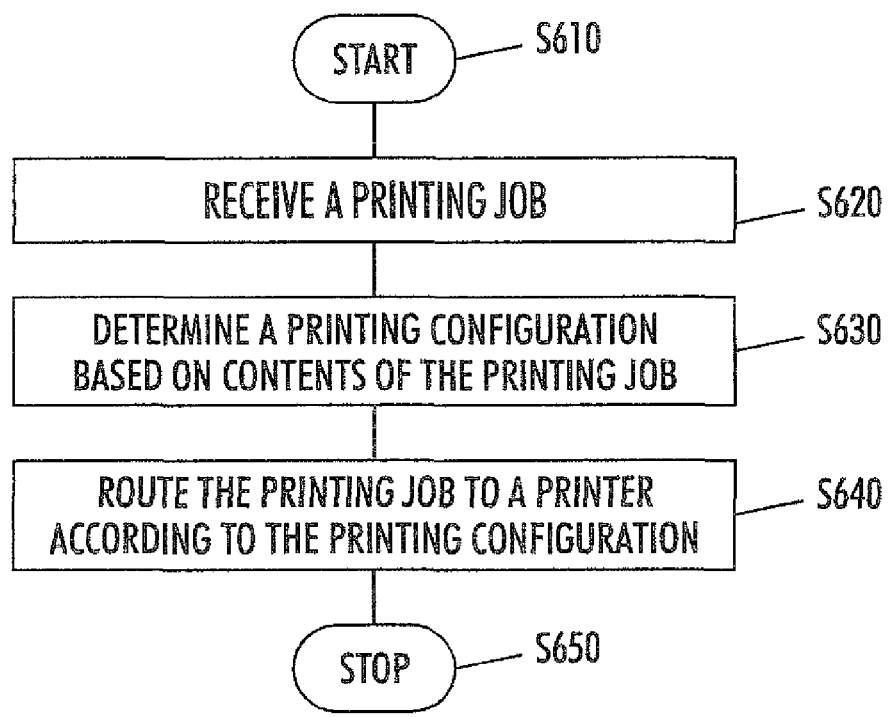
FIG. 6 shows a flowchart outlining an exemplary printing process.

FIG. 6 shows a flowchart outlining an exemplary printing process. The process starts at step S610 and proceeds to step S620. In step S620, a printing controller, such as a remote controller in FIG. 1, may receive a printing job. Additionally, the printing controller may maintain available printing configurations of a printing service provider, such as a group of printers 130B in FIG. 1. The process then proceeds to step S630.

In step S630, the printing controller may determine a configuration based on contents of the printing job. In an embodiment, the printing controller may calculate a demerit value for each of the available printing configurations according to contents of the printing job. The demerit value may include a portion of color gamut demerit, a portion of smoothness demerit, and a portion of spot color demerit. The process then proceeds to step S640.

In step S640, the printing controller may route the printing job to an appropriate printer of the printing service provider. The appropriate printer may be configured according to the determined configuration. The process then proceeds to step S650 and terminates.

For the ease of description, the disclosure is presented with demerit values. However, the disclosure may utilize other scales, such as cost functions, merit values, and the like.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for printing, comprising:
    storing a plurality of printing configurations for at least one printer;
    analyzing a printing job to determine printing characteristics;
    rating the plurality of printing configurations based on printing abilities according to color gamut ratings of the plurality of printing configurations corresponding to the printing characteristics;
    calculating the color gamut ratings by summing up an unsatisfied color gamut of the printing job according to printing abilities of the plurality of printing configurations; and
    selecting a printing configuration based on the rating.

2. The method according to claim 1, wherein calculating the color gamut rating further comprises:
    calculating the color gamut rating as a function of:

$$Demerit_{gamut} = 100 \times \left( \sum_{n=1}^{T} W(L, a, b) \times P_n \right) / T,$$

where $W(L,a,b)$ denotes a look-up table entry which can be a weight as a function of a color L, and pixel coordinates a and b, $P_n$ denotes a binary number indicating that whether the color at the pixel is inside or outside of the color gamut of the configuration (1 for outside and 0 for inside), and T denotes a total number of pixels for evaluation.

3. A method for printing, comprising:
    storing a plurality of printing configurations for at least one printer;
    analyzing a printing job to determine printing characteristics;
    rating the plurality of printing configurations based on printing abilities according to smoothness ratings of the plurality of printing configurations corresponding to the printing characteristics;
    calculating the smoothness ratings by summing up an area of unsatisfied smoothness of the printing job according to printing abilities of the plurality of printing configurations; and
    selecting a printing configuration based on the rating.

4. The method according to claim 3, wherein calculating the smoothness rating further comprises:
    calculating the smoothness rating as a function of:

$$Demerit_{uniform} = (K_I \times P_S \times P_{AI} + K_V \times P_V) \times C_i,$$

where $K_I$ denotes a weight factor for an image object portion, $P_S$ denotes a percentage of smoothness sensitive area of the image object portion, $P_{AI}$ denotes a percentage of image object area, $K_V$ denotes a weigh factor for a vector object portion, $P_V$ denotes a percentage of large uniform area, and $C_i$ denotes a scaling constant for the configuration.

5. A method for printing, comprising:
    storing a plurality of printing configurations for at least one printer;
    analyzing a printing job to determine printing characteristics;
    rating the plurality of printing configurations based on printing abilities according to spot color ratings of the plurality of printing configurations corresponding to the printing characteristics;
    calculating the spot color ratings by summing up unsatisfied spot colors of the printing job according to printing abilities of the plurality of configurations; and
    selecting a printing configuration based on the rating.

6. The method according to claim 5, wherein calculating the spot color rating further comprises:
    calculating the spot color rating as a function of:

$$Demerit_{spot} = K \times \sum_{i=1}^{N_{spots}} P_{AS}(i) \times P_n(i),$$

where $P_{AS}$ denotes a percentage of printing area of pantone spot colors, $P_n$ denotes a classification of the pantone spot colors (1 for outside the color gamut and 0 for inside the color gamut), $N_{spot}$ denotes a number of unique spot colors, and K denotes a weight factor for the spot color demerit.

* * * * *